United States Patent [19]

Zoeke

[11] 4,231,658
[45] Nov. 4, 1980

[54] DEVICE FOR POSITIONING A MASTER COPY-RECEIVING ROLLER OF A FORM PRINTING DEVICE

[75] Inventor: Siegfried Zoeke, Munich, Fed. Rep. of Germany

[73] Assignee: Siemens Aktiengesellschaft, Berlin & Munich, Fed. Rep. of Germany

[21] Appl. No.: 35,062

[22] Filed: May 1, 1979

[30] Foreign Application Priority Data

Jun. 16, 1978 [DE] Fed. Rep. of Germany ....... 2826530

[51] Int. Cl.² ............................................ G03B 27/10
[52] U.S. Cl. .................................................. 355/110
[58] Field of Search ................................. 355/104–110

[56] References Cited

U.S. PATENT DOCUMENTS

| | | | |
|---|---|---|---|
| 2,568,097 | 9/1951 | Sullivan | 355/110 |
| 2,743,653 | 5/1956 | Kennedy et al. | 355/104 |
| 3,224,355 | 12/1965 | Thomiszer | 355/110 X |
| 3,531,200 | 9/1970 | Moll | 355/104 X |
| 3,622,241 | 11/1971 | Dexter | 355/110 |

FOREIGN PATENT DOCUMENTS 1145923  3/1963  Fed. Rep. of Germany .

*Primary Examiner*—Richard A. Wintercorn
*Attorney, Agent, or Firm*—Hill, Van Santen, Steadman, Chiara & Simpson

[57] ABSTRACT

An electrostatic printing or copying device has a charge image of a form to be printed generated on a photoelectric recording medium with the assistance of a forms printing device. The forms printing device comprises a roller having a transparent cylinder which is arranged between two roller receiving flanges and a lamp tube arranged in the roller. The master copy to be imaged is applied to the transparent cylinder and is illuminated with the assistance of the lamp tube so as to be imaged on the recording medium. A drum acceptance flange is provided with a groove and a peripheral gear for a simple interchange of the roller. The roller is slipped onto the lamp tube for securing the roller in the printer. Subsequently the lamp tube, along with the roller, is rotated with respect to a housing part so that a centering roller engages in the groove of the roller acceptance flange and brings the roller into the correct position. Subsequently, the gear is engaged by a toothed wheel and the roller is brought into the correct position and locked thereat by means of the centering roller.

11 Claims, 1 Drawing Figure

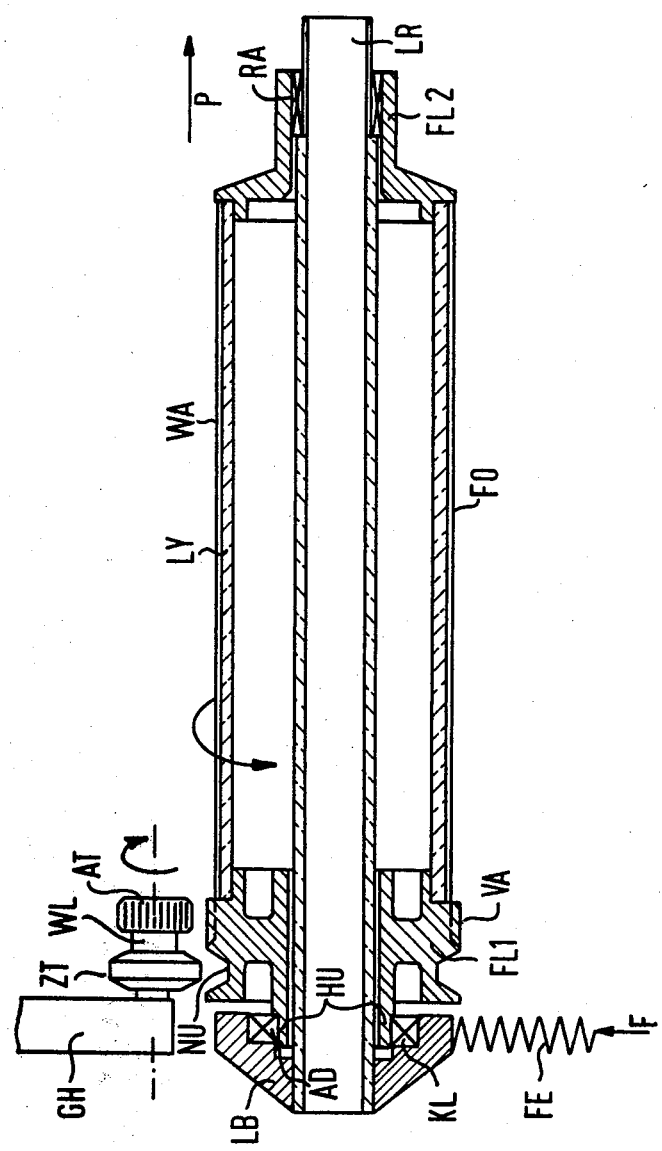

DEVICE FOR POSITIONING A MASTER COPY-RECEIVING ROLLER OF A FORM PRINTING DEVICE

BACKGROUND OF THE INVENTION

1. Field of the Invention

The present invention relates to a device for the arrangement of a roller of a forms printing device in a copying or printing machine, the roller receiving a master copy, and more particularly to such an arrangement in which the forms printing device contains a lamp tube seated on the housing of the device and the roller can be slipped onto and locked to the lamp tube.

2. Description of the Prior Art

Non-mechanical printers which function according to the electrostatic principle are well known in the art. Such printers generate either electrophotographic or electrographic charge images of the characters to be printed on a recording medium. The recording medium can be the paper per se or an intermediate carrier. The charge images on the recording medium are developed with the assistance of a toner. If the paper to be printed is itself employed as the recording medium, then the fixing installation by means of which the developed charge image is fixed on the paper, for example with heat, follows immediately upon the development installation. If, however, in non-mechanical printing, an intermediate carrier is employed, for example, a xerographic drum, then the developed charge images are transferred onto the paper to be printed and are only subsequently fixed.

In such electrostatic printers, there is a desire to provide the charge images of forms to be printed at the point in time of the generation of the charge images of the characters to be printed on the recording medium. It is therefore necessary that the generation of the charge images be independent of the character generation of the characters to be printed on the recording medium.

As an example of such a forms printing device is this structure set forth in the German published application No. 2,616,137. In this disclosure, a negative of the form to be printed is applied to a transparent roller. This negative is designated as the master copy in the following. A light source, for example a flourescent tube, is arranged within the transparent roller. This light source illuminates the roller from the interior and, therefore, also illuminates the master copy. The light proceeding from the master copy is imaged on the recording medium by sections by means of an aperture. The roller is moved in synchronism with the recording medium. Since forms of different size must be imaged on the recording medium, rollers having different circumferences are also required. This means that the rollers must be arranged in the printing device in such a manner that they can be easily interchanged.

SUMMARY OF THE INVENTION

The primary object of the present invention, therefore, is to provide a device by means of which the interchange of the rollers is possible in a simple manner.

The above object is achieved in that the roller comprises a cylinder and two roller acceptance flanges, in that the lamp tube can be rotated toward and away from the housing, in that the one roller acceptance flange has a groove on its circumference, in that a centering roller is rotatably arranged on the housing, which centering roller upon the rotating process of the lamp tube and, thus, of the roller, engages into the groove of the one roller acceptance flange and thus centers the roller, and that a drive installation is provided by way of which the roller can be driven.

The drive installation will preferably comprise a driving toothed wheel seated on the housing, which engages in a gear arranged on one of the roller acceptance flanges. Thereby, it is advantageous to arrange the centering roller and the driving toothed wheel next to one another on a shaft seated in the housing. Then, the groove of the centering roller and the gear for the driving toothed wheel lie directly next to one another on the one roller acceptance flange.

A simple support mounting of the roller on the lamp tube can be achieved when the lamp tube is secured on its one side in a bearing or bushing. The bearing structure has a bore on the interior thereof in which a bearing, such as a ball bearing, is arranged. Accordingly, the one roller acceptance flange extends toward the outside in a sleeve. Upon attachment of the roller to the lamp tube, the sleeve is then inserted into the bore below the bearing.

One obtains a seating of the roller on its other side in a simple manner in that a further bearing structure, for example a roller bearing, is arranged on the lamp tube, on which the other roller acceptance flange of the roller rests in the inserted state. The roller need not then contain any special seating.

The centering roller is advantageously designed as a conical structure. Correspondingly, the groove in the one roller acceptance flange will then have a conical form. By providing such a construction, the engagement of the centering roller in the groove is facilitated and the centering roller pushes the roller into the correct position.

A device constructed in accordance with the present invention has the following advantages. Upon changing the master copy, the appropriate roller need only be slipped onto the lamp tube. Upon rotation against the driving toothed wheel, the roller is forced into the correct working position by the centering roller without additional manipulations. After the rotation, the centering roller also takes over the safeguarding of the roller against lateral displacement. Moreover, it is prevented that the occurring length changes of the roller, due to the effect of heat, have an influence on the first writing location. Thereby, the first writing location lies at the side of the roller which is allocated to the centering roller.

The automatic centering and safeguarding of the roller with the assistance of the centering roller thus produces a significant simplification of the manipulation. Operating errors are out of the question, since the drive can only become effective when the roller is rotated into position. If the roller is slipped on with such imprecision that the centering does not function, rotation is prevented.

Since the bearings, on the one hand, are arranged on the lamp tube, and, on the other hand, in the bearing structure for the lamp tube, the roller need not contain any bearing of its own. Thereby, the construction of the roller is simplified and reduced in price and the weight of the roller can be significantly reduced.

BRIEF DESCRIPTION OF THE DRAWING

Other objects, features and advantages of the invention, its organization, construction and operation will be best understood from the following detailed description, taken in conjunction with the accompanying drawing, on which there is a single FIGURE showing, in sectional elevation, a device constructed in accordance with the present invention.

On the drawing, only a portion of the housing of the printing device is illustrated. The illustration of other parts of the printing device is not necessary, since the same are not required for an explanation of the invention.

DESCRIPTION OF THE PREFERRED EMBODIMENTS

Referring to the drawing, a shaft WL is rotatably mounted in a housing GH. A centering roller ZT and a driving gear AT are arranged on the shaft WL. The centering roller ZT has a conical shape.

A roller WA is to be seated on the housing GH. The roller WA comprises a transparent cylinder LY and two roller acceptance flanges FL1 and FL2. A master copy FO can be arranged on the transparent cylinder LY. The master copy FO is fastened thereto between the two roller acceptance flanges FL1 and FL2. In the particular example illustrated on the drawing, the master copy FO can be glued to webs of the roller acceptance flanges FL1 and FL2.

The one roller acceptance flange FL1 is provided with a circumferential groove NU about its periphery. The groove NU likewise has a conical shape. A gear VA is also arranged on the surface of the roller flange FL adjacent the groove NU. The teeth of the gear VA end shortly before the groove NU.

During operation, the roller WA must be slipped onto a lamp tube LR. Therefore, the lamp tube LR is secured in a bearing structure LB at its one end. The bearing structure LB includes a bore AD on the interior thereof in which a ball bearing KL is mounted. However, there is still a gap between the ball bearing KL and the lamp tube LR. The roller WA is inserted into this gap with its one roller acceptance flange FL1. To this end, the roller acceptance flange FL1 terminates in a sleeve HU.

A further bearing structure RA for example a roller bearing, is provided at the other end of the lamp tube LR. The roller bearing RA is arranged in such a manner that the other roller acceptance flange FL2 rests on the bearing RA in the inserted state of the roller WA. The lamp tube LR and, in particular, the bearing structure LB is pressed against the housing GH with the assistance of a force F. The force F is only schematically illustrated on the drawing by means of a spring FE, since the mechanism for rotating the lamp tube LR in, or respectively, out, is not the subject matter of the present invention.

The fastening of the roller WA in the printer occurs in the following manner. First of all, the lamp tube LR is rotated away from the housing GH. Subsequently, the roller WA is slipped onto the lamp tube LR. The sleeve HU thereby arrives under the ball bearing KL. Thereby, the one roller acceptance flange FL1 is rotatably seated on the lamp tube. In this position, the other roller acceptance flange FL2 rests on the roller bearing RA. Therefore, it is likewise rotatably arranged on the lamp tube LR. Now, the lamp tube LR is rotated against the housing GH. Thereby, the centering roller ZT engages the groove NU of the one roller acceptance flange FL1. By means of the conical design of the centering roller ZT and of the groove NU it is achieved that the centering roller ZT pulls the roller WA into the proper position. Thereby, the driving gear AT engages the driven gear VA of the one roller acceptance flange FL1. Therefore, the seating of the roller WA in the printing device has been completed.

When the roller WA is to be replaced, the lamp tube LR is rotated away from the housing GH against the spring force F.

The centering roller ZT and the driving gear AT are released from the roller WA, and the roller can now be lifted off of the lamp tube LR in the direction of the arrow P. Therefore, it is not necessary to release additional locking mechanisms.

It is conceivable that the drive mechanism may be mounted for rotation with respect to the lamp tube in certain applications. Therefore, obvious variations in the foregoing technique have not been illustrated.

In summary, an improvement has been provided for the accurate axial positioning of a roller, rotatably mounted on a lamp tube, in a copying machine. More specifically, a drive mechanism has a rotatable drive wheel and a first cam, either the roller or the tube carries a second cam and the drive mechanism and the roller-tube combination are mounted for relative movement toward and away from one another so that the interaction of the first and second cams causes axial alignment of the roller with respect to the drive mechanism so that the drive wheel of the drive mechanism engages a driven wheel carried by the roller. The drive and driven wheels may advantageously be constructed as gears and the first and second cams may advantageously be constituted by a conically-shaped roller of the drive mechanism and a complementally shaped groove, the groove and the driven gear being provided in an end flange structure of the roller. A biasing structure, preferably a compression spring, may be provided to normally urge the roller-lamp tube structure toward the drive mechanism.

Although I have described my invention by reference to particular embodiments thereof, many other changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a copying machine apparatus of the type in which a transparent roller is rotatably mounted on a lamp tube, the improvement for accurate axial positioning of the roller comprising:
   a drive mechanism including a rotatable drive wheel, and first camming means;
   mounting means mounting the lamp tube and said drive mechanism for relative movement toward and away from one another;
   a driven wheel carried by the roller for engagement with said drive gear; and
   second camming means carried by one of said roller and said tube for interaction with said first camming means to axially align said drive and driven wheels upon relative movement of said drive mechanism and the lamp tube toward each other.

2. The improved copying machine apparatus of claim 1, wherein:
   said mounting means pivotally mounts the lamp tube.

3. The improved copying machine apparatus of claim 1, wherein:
said mounting means pivotally mounts said drive mechanism.

4. The improved copying machine apparatus of claim 1, wherein:
said drive and driven wheels are further defined as drive and driven gears, respectively.

5. The improved copying machine apparatus of claim 4, wherein:
said drive mechanism is further defined as comprising a rotatable shaft carrying said drive gear, and a conically-shaped centering wheel carried on said drive shaft constituting said first camming means; and
said second camming means includes an end flange carried on the transparent roller having a circumferential groove shaped in conformity with and for receiving said centering wheel to constitute said second camming means.

6. The improved copying machine apparatus of claim 5, wherein:
said mounting means is further defined as including means mounting the lamp tube for pivotal movement, and biasing means normally urging the lamp tube toward said drive mechanism.

7. The improved copying machine apparatus of claim 6, wherein:
said end flange comprises a circumferentially disposed set of teeth adjacent said groove forming said driven gear.

8. The improved copying machine apparatus of claim 6, wherein:
said biasing means includes spring means.

9. The improved copying machine apparatus of claim 6, wherein:
said biasing means includes a compression spring having a fixed end and an end attached to said end flange.

10. Apparatus for mounting a roller in a copying machine comprising:
a lamp tube mounted for movement toward and away from the machine housing and including first and second ends;
a hollow transparent cylindrical roller including first and second ends and adapted to receive a master copy thereon and to be slid over said lamp tube;
a first end flange structure mounted on said first end of said roller and including a first axial bore receiving said lamp tube therethrough;
a second end flange structure mounted on said second end of said roller and including a second axial bore receiving said lamp tube therethrough and spaced therefrom;
a first bearing structure mounted on said first end of said lamp tube and receiving said first axial bore thereabout for rotatably mounting said first end of said roller;
a second bearing structure mounted on said second end of said lamp tube, said second end flange structure including a sleeve received in said second bearing structure for rotatably mounting said second end of said roller;
said second flange structure including groove means defining a conically-shaped peripheral groove about said second flange structure and a peripheral driven gear;
drive means mounted on the machine housing including a rotatable drive shaft, a drive gear carried on said shaft for engagement with said driven gear, and a conically-shaped roller carried on said shaft for centering engagement in said groove as said lamp tube moves toward the machine housing to align and engage said drive and driven gears.

11. The apparatus of claim 10, wherein said groove means and said driven gear are adjacent one another on said second flange structure with the teeth of said driven gear extending to a point adjacent said groove.

* * * * *